(12) United States Patent
Cook

(10) Patent No.: US 10,477,768 B2
(45) Date of Patent: Nov. 19, 2019

(54) EXTENDABLE DRAPER BELT

(71) Applicant: CNH Industrial America LLC, New Holland, PA (US)

(72) Inventor: Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 74 days.

(21) Appl. No.: 15/602,352

(22) Filed: May 23, 2017

(65) Prior Publication Data

US 2018/0338425 A1  Nov. 29, 2018

(51) Int. Cl.
| | |
|---|---|
| *A01D 61/02* | (2006.01) |
| *A01D 57/20* | (2006.01) |
| *A01D 61/00* | (2006.01) |
| *A01D 34/04* | (2006.01) |
| *A01D 34/40* | (2006.01) |

(Continued)

(52) U.S. Cl.
CPC ............ *A01D 61/02* (2013.01); *A01D 34/04* (2013.01); *A01D 34/40* (2013.01); *A01D 57/20* (2013.01); *A01D 61/002* (2013.01); *A01D 41/14* (2013.01); *A01D 41/148* (2013.01); *A01D 2101/00* (2013.01)

(58) Field of Classification Search
CPC ........ A01D 61/02; A01D 34/04; A01D 34/40; A01D 34/01; A01D 34/02; A01D 34/03; A01D 2101/00; A01D 17/10; A01D 17/101; A01D 2017/103; A01D 41/06; A01D 41/14; A01D 57/06; A01D 57/20; A01D 61/002; A01D 41/148
USPC ...................... 198/697, 690.2, 698, 833, 849
See application file for complete search history.

(56) References Cited

U.S. PATENT DOCUMENTS 1,862,101 A * 6/1932 Pax .................. A01D 61/002
                                          198/523
2,347,365 A    4/1944 Paradise
(Continued)

FOREIGN PATENT DOCUMENTS

CA     2 744 070 A1   12/2012
WO    2007095430 A2    8/2007

OTHER PUBLICATIONS

European Patent Office, Munich Extended European Patent Search, dated Oct. 16, 2018.

*Primary Examiner* — Robert E Pezzuto
*Assistant Examiner* — Adam J Behrens
(74) *Attorney, Agent, or Firm* — Peter K. Zacharias; Patrick M. Sheldrake

(57) ABSTRACT

An agricultural vehicle including a chassis, a feeder housing carried by the chassis, a header coupled to the feeder housing. The header includes a flexible cutter bar and at least one endless belt positioned rearwardly of the flexible cutter bar and configured to travel in a direction of travel for transporting a crop material to the feeder housing. The at least one endless belt includes a first belt having a first width transverse to the direction of travel and a second belt moveably attached to the first belt and having a second width transverse to the direction of travel and a front edge. The second belt includes a plurality of elongated protrusions transverse to the direction of travel and configured for contacting the crop material, and an engaging feature adjacent to the front edge and configured for moving the second belt in accordance with the flexible cutter bar.

18 Claims, 3 Drawing Sheets

(51) Int. Cl.
  *A01D 41/14* (2006.01)
  *A01D 101/00* (2006.01)

(56) References Cited

U.S. PATENT DOCUMENTS

| | | | | |
|---|---|---|---|---|
| 2,400,667 A * | 5/1946 | Toews | | A01D 61/02 |
| | | | | 144/245.2 |
| 4,058,204 A | 11/1977 | Arieh | | |
| 6,351,931 B1 | 3/2002 | Shearer | | |
| 6,857,517 B2 | 2/2005 | Damkjaer | | |
| 7,472,533 B2 * | 1/2009 | Talbot | | A01D 57/20 |
| | | | | 56/181 |
| 7,478,521 B2 | 1/2009 | Coers et al. | | |
| 7,908,836 B1 * | 3/2011 | Rayfield | | A01D 61/002 |
| | | | | 56/181 |
| 7,958,711 B1 * | 6/2011 | Sauerwein | | A01D 57/20 |
| | | | | 56/181 |
| 7,971,418 B2 | 7/2011 | Conrad et al. | | |
| 7,975,462 B1 * | 7/2011 | Figgins | | A01D 41/14 |
| | | | | 56/181 |
| 8,272,198 B1 * | 9/2012 | Allochis | | A01D 41/14 |
| | | | | 56/153 |
| 8,291,686 B1 * | 10/2012 | Cormier | | A01D 61/002 |
| | | | | 56/181 |
| 8,341,929 B2 * | 1/2013 | Sauerwein | | A01D 41/14 |
| | | | | 56/181 |
| 8,484,939 B1 * | 7/2013 | Cormier | | A01D 43/06 |
| | | | | 56/158 |
| 9,402,343 B1 * | 8/2016 | Allochis | | A01D 34/283 |
| 9,622,412 B2 * | 4/2017 | Hasenour | | A01D 57/20 |
| 2007/0238565 A1 * | 10/2007 | Marler | | A01D 43/077 |
| | | | | 474/237 |
| 2009/0266044 A1 * | 10/2009 | Coers | | A01D 41/14 |
| | | | | 56/208 |
| 2016/0360699 A1 * | 12/2016 | Allochis | | A01D 43/06 |
| 2018/0103580 A1 * | 4/2018 | Neely | | A01D 34/04 |

* cited by examiner

EXTENDABLE DRAPER BELT

FIELD OF THE INVENTION

The present invention relates to agricultural vehicles, and, more particularly, to agricultural vehicles which include a flexible draper header.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, and an unloading system, e.g., an unloading auger, on the combine is actuated to transfer the grain into the vehicle.

A typical header includes one or more cutters, e.g., cutter bars with reciprocating knives, which cut the crop material that is harvested from the field. Once the crop material is cut, a conveyor system, which is positioned rearwardly of the cutter(s), transports the crop material to the feeder housing. Modern headers generally have cutters and attachments which are specifically optimized to harvest a particular kind of crop material. For instance, the header may include a rotating reel with tines or the like to sweep the crop material towards the cutter(s). Alternatively, the header may include snouts and row units instead of a rotating reel and cutter bar(s).

A draper header is typically used to harvest fluffy or bushy crop material such as soy beans or canola. A draper header generally includes a conveyor that is in the form of one or more flat belts, known as draper belts, to convey the crop material to the feeder housing. Typically, a draper header may include two lateral draper belts that convey the crop material longitudinally inward and a center feed belt that conveys the crop material into the feeder housing. Each draper belt may be wrapped around rollers, for example various combinations of drive rollers and idler rollers. The draper belts may include cleats extending transversely across the full width of the header, which contact the crop material to help facilitate its transportation into the feeder housing.

Some draper headers are moveably mounted such that the elevation, roll, and/or pitch of the header may be adjusted, allowing the header to more aggressively harvest crop material. Lateral tilt cylinders may be incorporated to roll the header laterally (e.g., tilting left up/right down). An additional hydraulic cylinder may be added to control the pitch of the header (tilting fore/aft). Also, the position of the rotating reel and/or the angle of the cutter bar(s) may be adjusted. Specifically in regards to a flexible cutter bar, the flexible cutter bar may be equipped with actuators that adjust the vertical height of certain sections of the flexible cutter bar with respect to the frame of the header. For example, in the case of an undulating field, a header may continually alter the angle of its cutter bar(s) and/or the vertical height of its cutter bar(s) at various points along the cutter bar(s) in order to match the undulating terrain and harvest crop material which otherwise would have been left on the field.

Flexible draper headers having a flexible cutter bar can be tremendously instrumental in reducing header loss. However, although the greater flexibility of the cutter bar increases the crop material that is cut, it may cause header loss or damage the draper header. A flexible draper header may lose cut crop material at the stage of conveying the cut crop material onto the draper belts. For example, crop material may be lost between the distance from the point the crop material is cut to the front edge of the flexible draper belt. As the cutter bar tilts more forwardly and/or flexes vertically up or down, this distance or gap, may become greater as the cutter bar moves further away from the front edge of the flexible draper belt. Thereby, cut crop material and/or debris may be wedged or fall through this gap between the cutter bar and draper belt as the cut crop material is transferred onto the draper belt. Further, lodged crop material and/or debris may cause increased friction or wear on the draper belt, which may shorten the operating life of the draper header.

Various seal arrangements are known for reducing or preventing the infiltration of cut crop material and/or debris in between the distance from the cutter bar and draper belt. One such arrangement uses a flexible draper belt that completely flexes in accordance with the cutter bar, for example as disclosed in U.S. Pat. No. 7,478,521. However, with greater flexibility comes inflated manufacturing cost and increased maintenance to sustain the additional moving parts of the flexible draper header. Alternatively, a partially flexible cutter bar may be incorporated such that the cutter bar is relatively inflexible and thus the distance between the cutter bar and the draper belt is minimized. These arrangements may still cause header loss as some crop material may never be cut by the more rigid cutter bar. Other arrangements use an intermediate flex floor to span the distance between the stationary draper belt frame and the flexible cutter bar, for example as disclosed in U.S. Pat. No. 7,975,462 and owned by CNH Industrial. Known flexible draper headers may either improperly restrict the movement of the flexible cutter bar, may be costly to manufacture, and/or may be arduous to maintain and therefore are impractical for long-term operation.

What is needed in the art is a draper header which has a flexible cutter bar and a flexible draper belt that is cost effective and not burdensome to maintain.

SUMMARY OF THE INVENTION

In accordance with an aspect of the present invention, an agricultural vehicle with a flexible draper header has a flexible cutter bar and a multipart, flexing draper belt.

In accordance with another aspect of the present invention, an agricultural vehicle includes a chassis, a feeder housing carried by the chassis, and a header coupled to the feeder housing is provided. The header includes a flexible cutter bar and at least one endless belt positioned rearwardly of the flexible cutter bar and configured to travel in a direction of travel for transporting a crop material to the feeder housing. The at least one endless belt includes a first belt having a first width transverse to the direction of travel and a second belt moveably attached to the first belt and having a second width transverse to the direction of travel and a front edge. The second belt includes a plurality of elongated protrusions transverse to the direction of travel and configured for contacting the crop material, and an engaging feature adjacent to the front edge and configured for moving the second belt in accordance with the flexible cutter bar.

In accordance with yet another aspect of the present invention, an endless belt is positioned rearwardly of the flexible cutter bar and configured to travel in a direction of travel for transporting a crop material. The endless belt includes a first belt having a first width transverse to the direction of travel and a second belt moveably attached to the first belt and having a second width transverse to the direction of travel and a front edge. The second belt includes a plurality of elongated protrusions transverse to the direction of travel and configured for contacting the crop material. The second belt also includes an engaging feature adjacent to the front edge and configured for moving the second belt in accordance with the flexible cutter bar.

An advantage of the agricultural vehicle described herein is that it reduces header loss as the draper header harvests a field.

Another advantage of the agricultural vehicle described herein is that it reduces wear on the draper header.

Still another advantage of the agricultural vehicle described herein is that it provides an economical draper belt that can more easily be maintained.

BRIEF DESCRIPTION OF THE DRAWINGS

The above-mentioned and other features and advantages of this invention, and the manner of attaining them, will become more apparent and the invention will be better understood by reference to the following descriptions of an exemplary embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
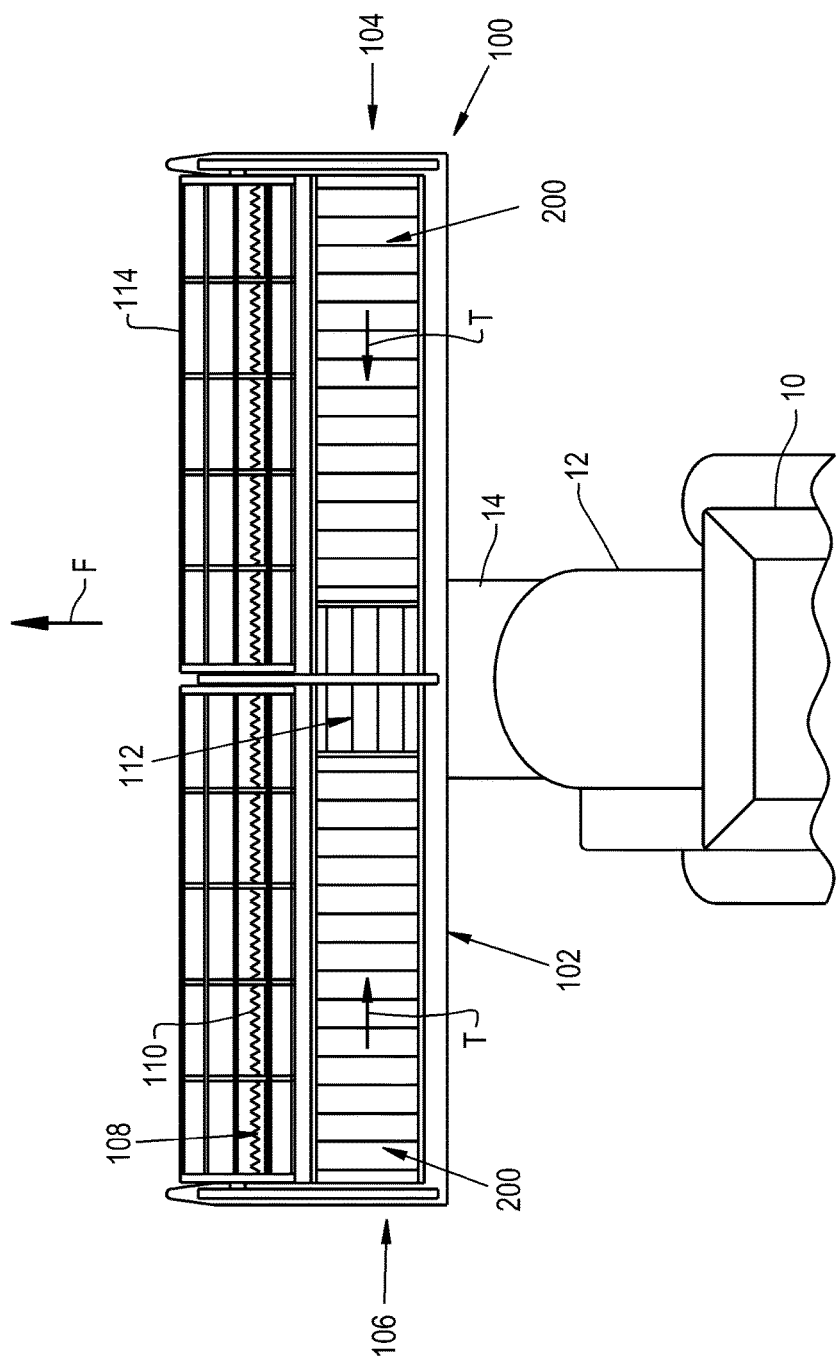
FIG. 1 is a top view of an agricultural vehicle in accordance with an exemplary embodiment of the present invention.
Figure 2:
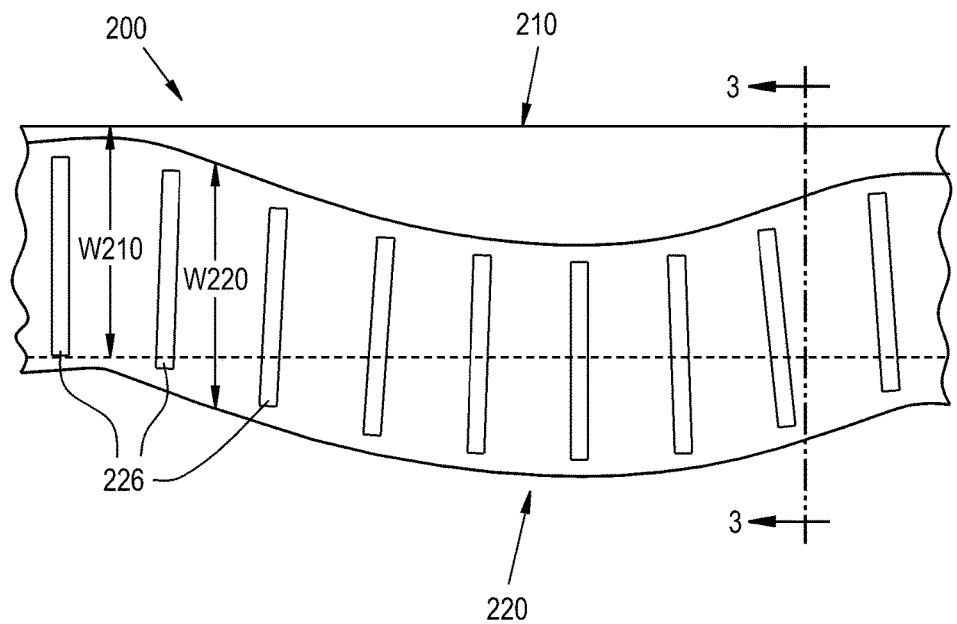
FIG. 2 is a top view illustrating a draper belt in accordance with the exemplary embodiment of the present invention.
Figure 3:
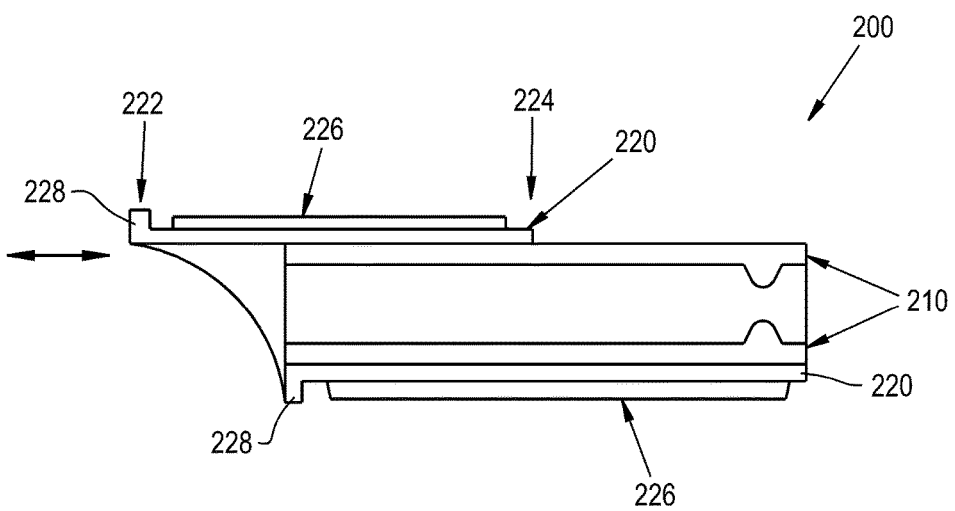
FIG. 3 is a cross-sectional view of the draper belt in accordance with the exemplary embodiment of the present invention taken across line 3-3 as shown in FIG. 2.

Referring now to the drawings, and more particularly to FIGS. 1-4, there is shown an exemplary embodiment of an agricultural vehicle 10 in the form of a combine harvester which generally includes a chassis 12, a feeder housing 14, and an attachment in the form of a header 100. Typically, the combine harvester 10 will include additional internal systems for the separation and handling of collected crop material, but these additional systems are omitted from view for brevity of description. It should be appreciated that the draper header 100 described and illustrated herein does not necessarily need to be included on combine harvesters, but can be incorporated in other agricultural vehicles such as windrowers.

The header 100 is coupled to the feeder housing 14 and supported by the chassis 12 of the agricultural vehicle 10. In the exemplary embodiment shown, the header 100 is in the form of a draper header 100 to harvest bushy or fluffy crop material. The draper header 100 has a frame 102 and a pair of opposed lateral ends 104, 106. The draper header 100 may support one or more flexible cutter bar(s) 108 with reciprocating knives 110 to cut crop material as the agricultural vehicle 10 travels in a forward direction, denoted by arrow F. The draper header 100 may further include a center feed belt 112 or a center auger that conveys the crop material into the feeder housing 14. The draper header 100 also includes one or more lateral, flexible draper belts 200 that are positioned rearwardly of the cutter bar(s) 108 and travel, i.e. rotate, in opposing directions of travel, denoted by each arrow "T", in order to convey the crop material inwardly to the center feed belt 112 and thereby the feeder housing 14. The header 100 may also include a rotating reel 114 with tines or the like to sweep the crop material inwardly.

Figure 4:
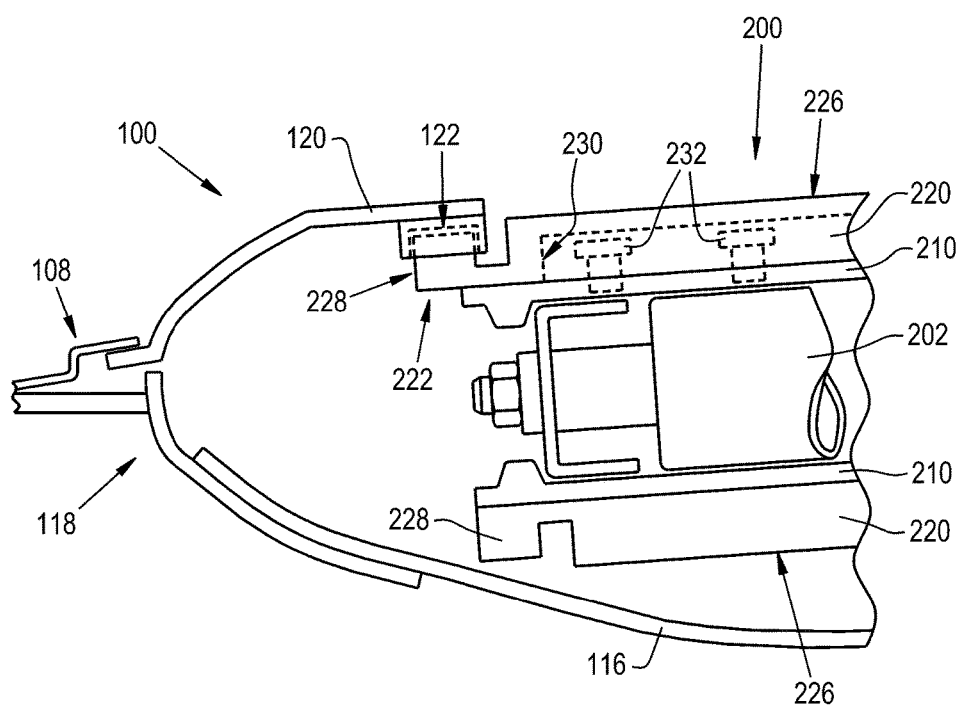
FIG. 4 is a right side sectional view of the draper header in accordance with the exemplary embodiment of the present invention.

The header 100 may also include a bottom support beam 116 and a structural support 118 for supporting the cutter bar(s) 108. The structural support 118 may be in the form of a C-shape beam or it may include any desired shape to provide support for the cutter bar(s) 108. The header 100 may also include an element 120, such as a rearwardly extending plate, that may at least partially extend over a front portion of the draper belts 200. The element 120 may also be in the form of a modular flooring composed of numerous plates such as those manufactured and sold by CNH Industrial and described in U.S. Pat. No. 7,975,462, which is incorporated herein by reference. The element 120 may include a recess or a flexible cam track 122 in order to help facilitate the flexing of the draper belts 200, which will be described further herein (FIG. 4). The flexible cam track 122 flexes in accordance with the flexible cutter bar(s) 108 as it may be coupled to or grooved into the element 120, which in turn is coupled to the flexible cutter bar(s) 108. The flexible cam track 122 may extend the full length of the draper header 100 across the underside of the element 120. There may be two flexible cam tracks 122 for each belt 200, which thereby the flexible cam tracks 122 would not extend across the full length of the draper header 100, but rather extend the lengths of each respective belt 200. As shown the flexible cam track 122 is positioned on the underside of the element 120; however, the flexible cam track 122 may be affixed to the end of the element 120 or grooved out of the element 120 from the top surface through the bottom surface of the element 120. In this regard, the flexible cam track 122 may be covered or open at its top such that a portion of the flexible draper belt 200 may partially extend into and abut a top surface of the flexible cam track 122 as shown or fully extend through the flexible cam track 122 to be substantially flush with the top surface of the element 120.

The flexible draper belts 200 are in the form of endless belts, which each include a lower belt 210 and an upper belt 220. The flexible draper belts 200 are configured to flex in accordance with the movement of the flexible cutter bar(s) 108 such that the edge of the belts 200 can extend outwardly (forwardly) or be pushed backwardly (rearwardly) to follow the movement of flexible cutter bar(s) 108 as they tilt and/or flex to follow the terrain of a field. Thereby, the issues associated with the distance from the point at which the crop material is cut to the front edge of the draper belts 200 as the cutter bar(s) 108 move(s) may be entirely avoided. The draper belts 200 may travel about respective rollers 202. The rollers 202 may include numerous rollers 202 in the form of drive rollers and idler rollers, and the rollers 202 may be rotated by known drives. The draper belts 200 may be in the form of any desired fabrics that may be coated with a rubber material and which may then be vulcanized.

The lower belt 210 has a width W210 that is transverse to the direction of travel T of the belt 210. The lower belt 210 has a bottom surface that contacts the rollers 202 and a top surface that interfaces with the upper belt 220. The lower belt 210 transmits the full torque and load exerted by the rollers 202 onto the lower belt 210.

The upper belt 220 is moveably attached to the lower belt 210. The upper belt 220 has a width W220, a top surface for contacting the crop material, and a bottom surface that interfaces with the top surface of the lower belt 210. The upper belt 220 also has a front edge 222 associated with the element 120 and a back edge 224. The upper belt 220 may include cleats 226 that extend the width W220 of the belt 220 and an engaging feature 228.

The upper belt 220 may slide forwardly or rearwardly beyond the width W210 of the lower belt 210 in accordance with the flexible cutter bar(s) 108 as it faces upwardly in contacting the crop material, and the upper belt 220 may recede as it faces downwardly (i.e. facing the ground) such that the width W220 of the upper belt 210 matches the width W210 of the lower belt 210. The upper belt 220 may extend marginally beyond the width W210 of the lower belt 210 or extend up to a third or even a half of the width W210 of the lower belt 210. The upper belt 220 may also be composed of a more flexible and/or stretchy material than the lower belt 210 so that it may easily move and flex relative to the lower belt 210. The upper belt 220 may only need to transmit the load exerted on it between each cleat 226.

The cleats 226 are configured to contact the crop material and help facilitate the movement of the crop material. Additionally, the cleats 226 help facilitate the connection between the lower and upper belts 210, 220. The cleats 226 are shown to be in the form of elongated, rectangular-shaped protrusions that extend upwardly from the upper belt 220. The cleats 226 may include an internal cavity 230, which may be in the form of an internal slot 230 (FIG. 4). The slots 230 may partially or fully span the length of each cleat 226. The slots 230 may slideably engage with fasteners 232, which may be fixedly attached to the lower belt 210 and partially disposed within the slots 230, such that the upper belt 220 may be fixed relative to the direction of travel T and may slide fore and aft relative to the lower belt 210 in a direction transverse to the direction of travel T. The fasteners 232 may be in the form of screws and/or bolts with accompanying nuts. Instead of fasteners 232, the lower belt 210 may include protrusions that engage with the slots 230, e.g., upwardly extending posts or a single rectangular beam that interfaces with the slots in a sliding tongue-and-groove like manner (not shown). Alternatively, the cleats 226 may not include slots 230 and may instead include a pair of grooves, one on each internal sidewall, that respectively receive a pair of rails or lips extending from the lower belt 210. Additionally, the internal slots 230 of the cleats 226 may have internally disposed biasing features at the top and/or bottom of the slots 230, such as springs coupled to a fastener or feature of the lower belt 210, in order to provide a preload on the upper belt 220 which biases the upper belt 220 to be in alignment with the position of the lower belt 210 until a force exerted by the cutter bar(s) 108 slides the upper belt 220 rearwardly or forwardly (not shown).

The engaging feature 228 is adjacent to the front edge 222, and is configured for moving the upper belt 220 in accordance with the flexible cutter bar(s) 108. The engaging feature 228 engages the flexible cam track 122 so that as the flexible cam track 122 flexes in accordance with the flexible cutter bar(s) 108, the engaging feature 228 is pulled or pushed by the flexible cam track 122, which thereby moves the upper belt 220 in accordance with the flexible cutter bar(s) 108. The engaging feature 228 may at least partially fit within the flexible cam track 122 as it rotates about the rollers 202. The engaging feature 228 may be in the form of a lengthwise protrusion extending upwardly and along the entire length of the upper belt 220. The engaging feature 228 may have a backwall, i.e. an inside facing wall, that acts as a barrier for the crop material. For example, cut crop material may collect in a space in between the backwall of the engaging feature 228 and the cleats 226. Thus, the engaging feature 228 of the front edge 222 may simultaneously engage with the flexible cam track 122 and prevent crop material from falling out of the header 100. The engaging feature 228 may be separately attached to the upper belt 220 or it may be formed as part of the upper belt 220 as a monolithic upwardly extending end portion.

As the belts 200 rotate, each engaging feature 228 of the upper belts 220 will engage, for example begin to fit within the flexible cam track 122, as each upper belt 220 rotates from the underside to the topside of the draper header 100. Each engaging feature 228 will disengage with the flexible cam track 122 as the upper belt 200 rotates from the topside to the bottom side of the draper header 100. As the engaging features 228 disengage with the flexible cam track 122, the upper belt 220 will slide back onto the lower belt 210. In this regard, the respective widths W210, W220 of the belts 210, 220 will realign so that the position of the upper belt 220 matches the position of the lower belt 210. It is conceivable to include a bottom flexible cam track that extends along the bottom side of the draper header 100. The bottom flexible cam track may be substantially stationary to allow the upper belt 220 to slide back onto the lower belt 210, or the bottom flexible cam track may mirror the movement of the flexible cam track 122, Additionally, it is conceivable to include guides or flexible cam tracks at the sides of the header 100. In this regard, the engaging features 228 of the upper belts 220 would always engage with a flexible cam track as the upper belts 220 travel along the topside and underside of the header 100.

If the draper header 100 includes a center feed belt 112 as shown, the center feed belt 112 may flex up and down in accordance with the cutter bar(s) 108 as well. The center feed belt 112 may be separately equipped with actuators to move and pivot the center feed belt 112 to maintain its relationship to the cutter bar(s) 108 as the draper header 100 traverses a field. Additionally, the entire infeed may pivot up and down such that it would be a rigid section of the cutter bar 108, approximately five feet long in the center of the draper header 100.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
   a chassis;
   a feeder housing carried by the chassis;
   a header coupled to the feeder housing, said header including:
   a flexible cutter bar; and
   at least one endless belt positioned rearwardly of the flexible cutter bar and configured to travel in a direction of travel for transporting a crop material to the feeder housing, said at least one endless belt including:
   a first belt having a first width transverse to said direction of travel; and
   a second belt moveably attached to the first belt and having a second width transverse to said direction of travel and a front edge, said second belt including:
   a plurality of elongated protrusions transverse to said direction of travel and configured for contacting the crop material; and
   an engaging feature adjacent to the front edge and configured for moving the second belt in accordance with said flexible cutter bar,
   wherein said second belt is slideable in a transverse direction to said direction of travel such that said second belt slides forwardly or rearwardly relative to said first belt and in accordance with a movement of said flexible cutter bar.

2. The agricultural vehicle of claim 1, further including a flexible cam track coupled to the flexible cutter bar and flexing in accordance with the flexible cutter bar.

3. The agricultural vehicle of claim 2, wherein said engaging feature engages with said flexible cam track such that as said flexible cam track flexes in accordance with the flexible cutter bar said engaging feature is pulled or pushed by the flexible cam track which moves the second belt in accordance with the flexible cutter bar.

4. The agricultural vehicle of claim 3, wherein said engaging feature at least partially fits within said flexible cam track.

5. The agricultural vehicle of claim 1, wherein said engaging feature is in the form of a lengthwise protrusion extending upwardly and along a length of the second belt.

6. The agricultural vehicle of claim 1, wherein each of said plurality of elongated protrusions extends upwardly and includes an internal slot.

7. The agricultural vehicle of claim 6, wherein said first belt and said second belt are attached by a plurality of fasteners fixedly attached to said first belt and at least partially disposed within said internal slots of said plurality of elongated protrusions such that said second belt is fixed relative to said direction of travel and slideable relative to said first belt in a direction transverse to said direction of travel.

8. The agricultural vehicle of claim 1, wherein said second belt slides forwardly or rearwardly beyond the width of said first belt in accordance with the flexible cutter bar as it faces upwardly in contacting the crop material and said second belt recedes as it faces downwardly such that the width of the second belt matches the width of the first belt.

9. The agricultural vehicle of claim 1, wherein said second belt is composed of a more flexible material than said first belt.

10. An endless belt positioned rearwardly of a flexible cutter bar and configured to travel in a direction of travel for transporting a crop material, said endless belt including:
    a first belt having a first width transverse to said direction of travel; and
    a second belt moveably attached to the first belt and having a second width transverse to said direction of travel and a front edge, said second belt including:
    a plurality of elongated protrusions transverse to said direction of travel and configured for contacting the crop material; and
    an engaging feature adjacent to the front edge and configured for moving the second belt in accordance with said flexible cutter bar,
    wherein said second belt is slideable in a transverse direction to said direction of travel such that said second belt slides forwardly or rearwardly relative to said first belt and in accordance with a movement of said flexible cutter bar.

11. The endless belt of claim 10, further including a flexible cam track coupled to the flexible cutter bar and flexing in accordance with the flexible cutter bar.

12. The endless belt of claim 11, wherein said engaging feature engages with said flexible cam track such that as said flexible cam track flexes in accordance with the flexible cutter bar said engaging feature is pulled or pushed by the flexible cam track which moves the second belt in accordance with the flexible cutter bar.

13. The endless belt of claim 12, wherein said engaging feature at least partially fits within said flexible cam track.

14. The endless belt of claim 10, wherein said engaging feature is in the form of a lengthwise protrusion extending upwardly and along a length of the second belt.

15. The endless belt of claim 10, wherein each of said plurality of elongated protrusions extends upwardly and includes an internal slot.

16. The endless belt of claim 15, wherein said first belt and said second belt are attached by a plurality of fasteners fixedly attached to said first belt and at least partially disposed within said internal slots of said plurality of elongated protrusions such that said second belt is fixed relative to said direction of travel and slideable relative to said first belt in a direction transverse to said direction of travel.

17. The endless belt of claim 10, wherein said second belt slides forwardly or rearwardly beyond the width of said first belt in accordance with the flexible cutter bar as it faces upwardly in contacting the crop material and said second belt recedes as it faces downwardly such that the width of the second belt matches the width of the first belt.

18. The endless belt of claim 10, wherein said second belt is composed of a more flexible material than said first belt.

* * * * *